(12) United States Patent
Clark

(10) Patent No.: US 7,780,059 B2
(45) Date of Patent: *Aug. 24, 2010

(54) METHOD OF FORMING A COMPONENT ON A SUBSTRATE

(75) Inventor: Daniel Clark, Derby (GB)

(73) Assignee: Rolls-Royce plc, London (GB)

( * ) Notice: Subject to any disclaimer, the term of this patent is extended or adjusted under 35 U.S.C. 154(b) by 377 days.

This patent is subject to a terminal disclaimer.

(21) Appl. No.: 11/889,240

(22) Filed: Aug. 10, 2007

(65) Prior Publication Data
US 2008/0173386 A1 Jul. 24, 2008

(30) Foreign Application Priority Data
Aug. 12, 2006 (GB) ................... 0616116.0

(51) Int. Cl.
B23K 20/02 (2006.01)
(52) U.S. Cl. ............... 228/101; 228/193; 228/253; 427/241; 427/189
(58) Field of Classification Search ............... 228/101, 228/193, 253; 427/241, 189
See application file for complete search history.

(56) References Cited
U.S. PATENT DOCUMENTS

| 3,456,092 | A | | 7/1969 | Rush |
| 3,617,685 | A | | 11/1971 | Brill-Edwards |
| 5,728,285 | A | * | 3/1998 | Mathew ...................... 205/182 |
| 6,268,584 | B1 | | 7/2001 | Keicher et al. |
| 6,489,583 | B1 | | 12/2002 | Feng et al. |
| 6,596,411 | B2 | | 7/2003 | Feng |
| 6,652,677 | B2 | * | 11/2003 | Speigel et al. .............. 148/525 |
| 2005/0161146 | A1 | | 7/2005 | Graf |
| 2007/0221705 | A1 | * | 9/2007 | Arnett et al. ................. 228/101 |
| 2008/0304975 | A1 | * | 12/2008 | Clark et al. ............. 416/241 R |

FOREIGN PATENT DOCUMENTS

| EP | 0 790 875 A | 11/2000 |
| EP | 1 116 545 A | 7/2001 |
| EP | 1 216 784 A | 6/2002 |
| WO | WO 2004/020139 PU | 3/2004 |
| WO | WO 2006/120372 PU | 11/2006 |

* cited by examiner

Primary Examiner—Kiley Stoner
Assistant Examiner—Erin B Saad
(74) Attorney, Agent, or Firm—Jeffrey S. Melcher; Manelli Denison & Selter PLLC

(57) ABSTRACT

A method of forming a structure by a material additive process, the method comprising the steps: providing a substrate having a surface, providing an interlayer on the surface which conforms to the surface of the substrate, forming a melt pool in the interlayer, the depth of the melt pool being less than the depth of the interlayer, selectively depositing a material within the melt pool, allowing the material to solidify, and applying heat and pressure to diffusion bond the material to the substrate.

14 Claims, 2 Drawing Sheets

METHOD OF FORMING A COMPONENT ON A SUBSTRATE

CROSS-REFERENCE TO RELATED APPLICATIONS

This application claims priority to GB 0616116.0, filed 12 Aug. 2006.

BACKGROUND OF THE INVENTION

This invention concerns a method of forming structures on a substrate using a high-temperature additive process, and in particular on a single-crystal superalloy substrate using a powder fed or wire fed laser deposition process.

Components of gas turbine engines such as combustors and turbine blades are commonly manufactured from nickel or cobalt based superalloys.

The superalloys are creep resistant at high temperatures but their characteristics make them prone to cracking on welding, or the welds may be brittle during service.

Superalloy structures are conventionally cast but may be formed through direct metal deposition. Direct metal deposition and other additive manufacturing techniques are high temperature processes that use multiple passes to deposit sequential layers onto a substrate. Each layer may have the same or different footprint to the other layers. In this way complex structures can be developed.

During the deposition process a laser or electron beam or such like is moved relative to the substrate and is directed at the substrate to create a traversing melt pool. Material, either in powder or wire form, is deposited into the melt pool and melted. As the melt pool traverses away from the deposition location the material solidifies to form part of a layer of the structure. Subsequent deposition can be used to deposit further layers on the first layer. Once the structure is complete it may be machined to remove excess material and to provide a structure to a higher tolerance than may be achievable by the direct metal deposition alone.

The melt pool in the substrate can be a source of flaws and of adverse microstructure. For substrates of a superalloy, particularly alloys of a single-crystal form, these created flaws and adverse microstructures are further undesirable as they can be a source cracks with the fatigue life of the component being impaired.

SUMMARY OF THE INVENTION

It is an object of the present invention to seek to provide an improved deposition technique whereby structures can be formed on a substrate, particularly a substrate formed of a superalloy.

According to a first aspect of the invention there is provided a method of forming a structure by a material additive process, the method comprising the steps: providing a substrate having a surface, providing an interlayer on the surface which conforms to the surface of the substrate, forming a melt pool in the interlayer, the depth of the melt pool being less than the depth of the interlayer, selectively depositing a material within the melt pool, allowing the material to solidify, and applying heat and pressure to diffusion bond the material to the substrate.

Preferably the interlayer is formed through an electrolysis process. The interlayer may be a foil ultrasonically laminated to the substrate. Beneficially, both these methods mechanically interlock the interlayer with the substrate surface minimising defects and pores between the interlayer and the surface of the substrate, which improves the strength of the join between the structure and the component when these are diffusion bonded and assists resistance to deposition induced thermal contraction strains.

Preferably the interlayer has a depth between 100 μm and 250 μm. Preferably the melt pool has a depth of penetration into the interlayer between 50 μm and 100 μm.

Preferably the melt pool is formed by directing a high-energy beam at the interlayer. The high-energy beam may be a laser or electron beam.

The material may be deposited in wire form. The material may be deposited to the melt pool as a powder from a powder head.

The substrate may be a single crystal article, preferably formed of a superalloy based on nickel or cobalt. The deposition material is preferably a superalloy based on nickel or cobalt.

BRIEF DESCRIPTION OF THE DRAWINGS

Embodiments of the present invention will now be described by way of example only and with reference to the accompanying drawings, in which.

DETAILED DESCRIPTION OF THE INVENTION

Figure 1:
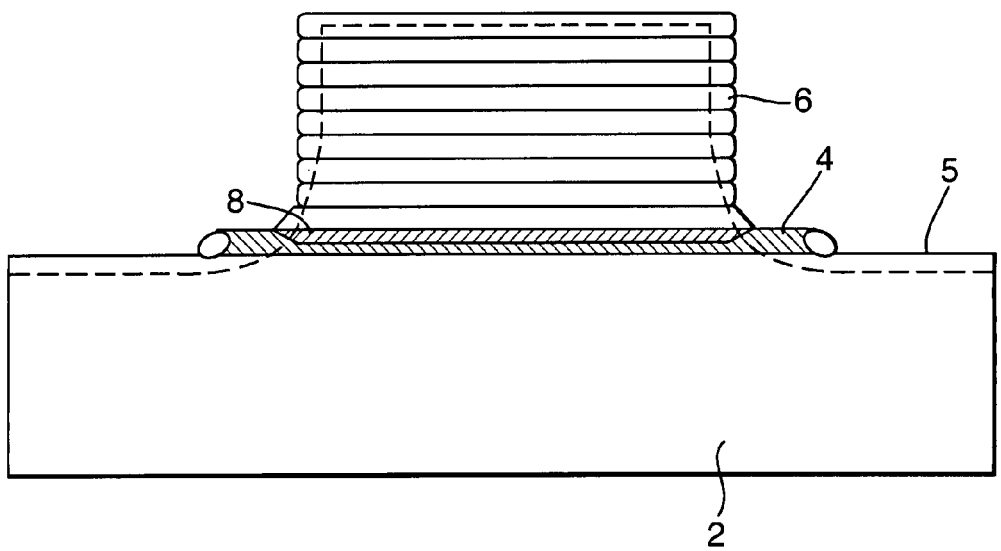
FIG. 1 depicts a boss formed on a substrate by a method according to the present invention.

In FIG. 1 a boss 6 is formed on a combustor case 2 formed of a nickel-chromium superalloy by a technique of direct laser deposition.

The combustor case substrate 2 is annular in form and has a outer surface 5 to which the boss 6 is deposited. The substrate is formed of a nickel based single-crystal alloy available from Special Metal Wiggin Limited under the registered trade mark INCOTHERM. The alloy has the following composition:

| | |
|---|---|
| Chromium | 22 wt % |
| Molybdenum | 3% wt % |
| Silicon | 1.4 wt % |
| Carbon | 0.01 wt % |
| Impurities | Trace |
| Nickel | Balance |

A nickel based joining layer or interlayer 4 is deposited onto the substrate through electroplating. The composition of the interlayer is similar to that of the substrate and contains a proportion of chromium.

The combustor casing is negatively masked using a wax leaving uncoated the area upon which the interlayer is to be formed. An electrode is attached to the combustor casing which is submerged in a bath containing a 600 g/liter solution of nickel sulphamate mixed with a solution of cobalt sulphamate. A field is applied between a nickel anode and the combustor casing, which acts as the cathode, to deposit a nickel and chromium alloy to the desired location. The concentrate of cobalt sulphamate in the electroplate solution is monitored and further material added to control the cobalt content of the deposited alloy.

In an alternative technique of electroplating the substrate 2 the anode has two distinct areas: a nickel area and a cobalt area. The percentage of the total current passing to the anode is divided between the areas in the proportion required in the alloy deposited at the cathode. To deposit a coating having 78% nickel and 22% cobalt then 78% of the electrolysis current is applied to the nickel electrode and 22% to the cobalt electrode.

Once the interlayer has been formed to its desired depth of between 100 μm and 200 μm, this depth being determined at least in part by the depth of the melt pool that will subsequently be formed therein, the field is removed. The combustor case is removed from the electrolysis bath and the wax mask removed.

Electroplating is particularly preferred as a method of forming the interlayer as the deposited layer conforms to the substrate surface and has minimal micro fissures and pores. The layer is also mechanically attached to the surface. These functionalities are desired for the post processing steps such as direct metal deposition and diffusion bonding, as will be subsequently described.

An alternative method of forming the interlayer is through ultrasonic welding. A 200 μm foil sheet of nickel is placed against the combustor casing and subjected to high frequency ultrasonic acoustic vibrations from a piezoelectric transducer. Joining of the foil with the combustor casing occurs not through heating, but instead through high-pressure dispersion of surface oxides and local motion of the materials. Any heating is insufficient to melt the foil or the combustor casing and the integrity of the combustor casing is not compromised.

It will be appreciated that both the electroplating and the ultrasonic welding techniques are ambient, or otherwise low temperature processes that do not exert excessive thermal stress on the substrate.

The formed layer conforms to the substrate surface and has minimal micro fissures and pores. The layer is also mechanically attached to the surface. These functionalities are desired for the post processing steps such as direct metal deposition and diffusion bonding, as will be subsequently described.

The deposited interlayer has a strong mechanical bond with the substrate and can resist 6,800 psi (478 kg/cm$^2$) in pull-off testing. In the next step of the manufacturing process the interlayer is heated with a high-energy beam which forms a melt pool 8 in the interlayer and significant thermal stress. The strong mechanical bond created between the combustor casing and interlayer resists thermal expansion and prevents lift-off of the interlayer and the creation of voids and discontinuities between the interlayer and the substrate.

A particularly suitable high-energy beam is created from a $CO_2$ laser of type TR1750/380 coupled to a CNC control unit. Satisfactory results are obtained with the laser operating at a laser power between 50 and 1000 W and with a scanning speed between 200 to 400 mm/min. In order to obtain the desired small focal spot of the laser beam, it may be required to position a beam expander (not shown) above the focal lens.

The melt pool formed by the laser descends to a depth of around 100 μm at its maximum. This is less than the depth of the formed interlayer, which has a depth of around 200 μm. Using the laser at a lower power, or traversing at a faster rate, will result in a slightly shallower melt pool. In this case an interlayer of lesser depth could be used. It is important that in all cases the depth of the melt pool is less than the depth of the interlayer to isolate the melt pool from the substrate to avoid damage to the micro-structure and grain boundary of the substrate.

Where the high-energy beam is an electron beam the melt pool has a greater depth than one formed by a $CO_2$ laser. In these cases it may be necessary to form the interlayer to a depth in excess of 200 μm to provide a depth that is greater than the depth of the melt pool.

Figure 3:
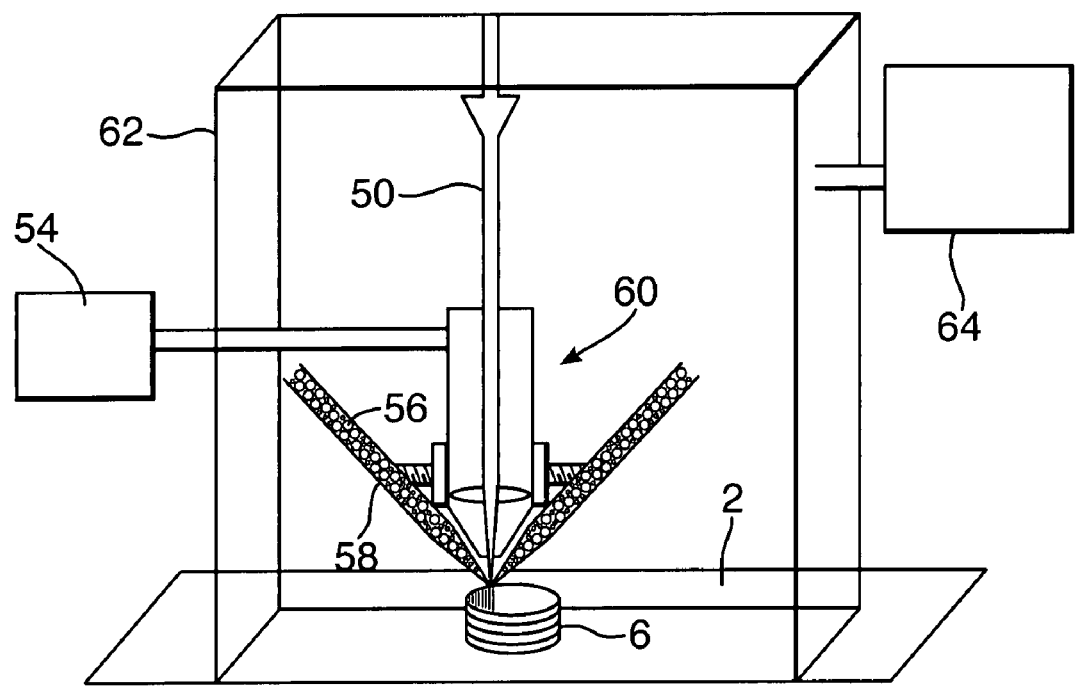
FIG. 3 depicts a deposition apparatus

A controlled atmosphere is arranged around the melt pool to prevent contamination. An inert atmosphere of argon is preferred. Appropriate deposition apparatus is depicted in FIG. 3. An envelope 62 encloses a deposition head 60 in an inert atmosphere supplied from a source of argon 64. The combustor case 2 provides one wall of the enclosure. The laser beam 50 is directed through the deposition head 60 to the substrate 2 with the interlayer onto which the boss 6 is to be formed.

The laser 50 is focused down to provide the required energy density at the working region on the substrate 2. Powder 56 is supplied via powder feed tubes 58 to the working region. The laser 50 and the powder feed tubes 58 are all held static relative to each other, with the relative position and movement of the deposition head being controlled by a computer control system 54. As discussed earlier, the focused laser melts the powder 56, which is fed to the substrate in an argon carrier gas at a rate between 8 to 20 g/min, and the interlayer which mix and solidify when the laser 50 moves to a new position. In each pass, the deposition head puts down material in a layer that has a height of approximately 0.5mm. The powder is relatively homogenous and has a similar composition to that of the substrate, in this case a powder consisting of nickel/cobalt superalloy particles.

To build up a boss structure, which is significantly higher than 0.5 mm, it is necessary to pass the deposition head over the working region of the substrate a number of times, with each pass putting down material to an approximate height of 0.5 mm. Each preceding layer is subject to heat addition from the laser to form a melt pool into which the material is added.

The structure of the interlayer is relatively soft in comparison with the substrate and is mechanically bonded to the substrate such that thermal disparities between the temperature of the melt pool, the non-melted interlayer, and the substrate will not cause delamination of the interlayer. The "soft" layer does not fracture when melted by the laser and fatigue life of the component is not impaired.

The substrate is isolated from the melt pool by a depth of unmelted material in the interlayer. The depth of unmelted material is preferably about half the depth of the interlayer as this provides a suitable tolerance margin. However, depending on the control system of the deposition technique other depths—either greater or smaller—may be appropriate.

By isolating the substrate from the melt pool significant thermal damage to the substrate is prevented and crack generation sites are reduced. The fatigue life of the component is increased and lifetime costs for each component is reduced.

Whilst the invention has been described for a method of depositing a raised structure on the surface, as described with reference to FIG. 2, the method may be equally applicable to a repair method.

Figure 2:
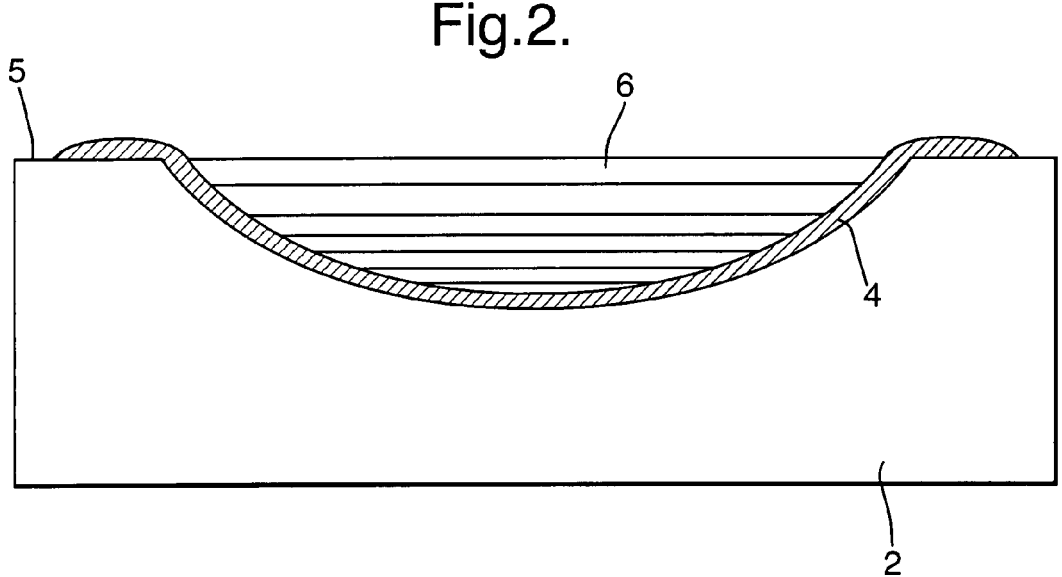
FIG. 2 depicts a substrate repair where the repair is made according to the present invention.

In FIG. 2 the substrate, in this case again a combustor casing, has a surface defect, which may be a crack or other damage, which is removed by a milling technique to leave a depression in the surface 5 of the casing 2.

Following the method described above, an interlayer 4 is first formed over the surface of the depression using electrolysis. The interlayer has a depth of 200 μm. A series of layers is provided on the interlayer through direct metal deposition to form a structure 6 that fills the depression.

In both the embodiments described with reference to FIG. 1 and FIG. 2 it is necessary to consolidate the join between the deposited structures 6 and the substrate 2. The interlayer 4 acts as temporary mechanical adhesion that provides a bond strong enough to resist delamination during the high temperature deposition process that also conforms with the substrate surface to a degree that enables the structure and the substrate to be diffusion bonded.

Accordingly the substrate 2 and the structure 6 are heated to about two thirds of the alloy melting point in Kelvin, i.e. a temperature of 1100° C. in this example and a pressure applied for between 30 seconds and 4 hours depending on the temperature and pressure applied. The pressure is selected in accordance with the degree of contact achieved, and is between a maximum value of 200 Mpa and a minimum of atmospheric.

The diffusion bonding creates a monolithic joint through the formation of bonds at the atomic level. The applied pressure at high temperature encourages plastic deformation which aids interdiffusion.

Solid-state diffusion bonding produces high quality joints with neither metallurgical discontinuities nor porosity existing across the interface. Surface connected porosity existing between joints pressurises during a HIPping process and resists consolidation leading to a weaker join.

The interlayer diffuses at the high temperature and disperses within the substrate or the structure. Thus, any difference between the composition of the substrate, interlayer and structure are smoothed over the bond join.

After diffusion bonding the substrate and structure, which may have been formed deliberately oversized to allow this process, may be machined to remove discontinuities formed during the deposition process. A conventional machining process may be used.

Various modifications may be made without departing from the scope of the invention.

For example, the invention has been described with the interlayer being formed locally to the point of deposition. It could, of course be formed over a larger area, but this would necessitate its removal post-processing.

The embodiments of the invention have been directed to direct metal deposition using a powder jet. The material could equally have been applied from a wire directed towards the melt pool.

The laser may be a Nd:YAG or fibre laser that may be pulsed. Alternatively, an electron beam welding may be used. In this case the deposition process will be carried out under vacuum.

We claim

1. A method of forming a structure by a material additive process, the method comprising the steps in sequential order:
   providing a substrate having a surface;
   providing an interlayer on the surface which conforms to the surface of the substrate;
   forming a melt pool in the interlayer, the depth of the melt pool being less than the depth of the interlayer;
   selectively depositing a material within the melt pool;
   allowing the material and the melt pool to solidify; and
   applying heat and pressure to diffusion bond the material to the substrate.

2. A method according to claim 1, wherein the interlayer is formed through an electrolysis process.

3. A method according to claim 1, wherein the interlayer is a foil ultrasonically laminated to the substrate.

4. A method according to claim 1, wherein the interlayer has a depth between 100 µm and 250 µm.

5. A method according to claim 1, wherein a high energy beam is directed at the interlayer to form the melt pool.

6. A method according to claim 5, wherein the high energy beam is a laser or electron beam.

7. A method according to claim 1, wherein the material is deposited from a wire.

8. A method according to claim 1, wherein the material is deposited as a powder.

9. A method according to claim 1, wherein the substrate is a single crystal article.

10. A method according to claim 1, wherein the substrate is a superalloy based on nickel or cobalt.

11. A method according to claim 1, wherein the material is a superalloy based on nickel or cobalt.

12. A method according to claim 1, wherein the melt pool has a depth between 50 µm and 100 µm.

13. A method according to claim 2, wherein the interlayer has a depth between 100 µm and 250 µm.

14. A method according to claim 3, wherein the interlayer has a depth between 100 µm and 250 µm.

* * * * *

UNITED STATES PATENT AND TRADEMARK OFFICE
CERTIFICATE OF CORRECTION

| | | |
|---|---|---|
| PATENT NO. | : 7,780,059 B2 | Page 1 of 1 |
| APPLICATION NO. | : 11/889240 | |
| DATED | : August 24, 2010 | |
| INVENTOR(S) | : Daniel Clark and Jeffrey Allen | |

It is certified that error appears in the above-identified patent and that said Letters Patent is hereby corrected as shown below:

Title page, item [75] should read as follows:

(75) Inventor: Daniel Clark, Derby (GB); Jeffrey Allen, Derby (GB)

Signed and Sealed this

Twelfth Day of October, 2010

David J. Kappos
*Director of the United States Patent and Trademark Office*